United States Patent
Jang et al.

(10) Patent No.: US 9,899,945 B2
(45) Date of Patent: Feb. 20, 2018

(54) MOTOR DRIVING APPARATUS AND HOME APPLIANCE INCLUDING THE SAME

(71) Applicant: LG ELECTRONICS INC., Seoul (KR)

(72) Inventors: Minho Jang, Seoul (KR); Junho Lee, Seoul (KR); Chungill Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/232,855

(22) Filed: Aug. 10, 2016

(65) Prior Publication Data
US 2017/0047875 A1  Feb. 16, 2017

(30) Foreign Application Priority Data
Aug. 11, 2015  (KR) .................. 10-2015-0113422

(51) Int. Cl.
*H02P 21/00* (2016.01)
*H02P 21/18* (2016.01)
(Continued)

(52) U.S. Cl.
CPC .............. *H02P 21/18* (2016.02); *H02P 6/183* (2013.01); *H02P 6/20* (2013.01); *H02P 6/22* (2013.01); *H02P 27/06* (2013.01)

(58) Field of Classification Search
CPC .. H02P 6/18; H02P 6/185; H02P 21/14; H02P 21/22; H02P 6/16; H02P 21/06;
(Continued)

(56) References Cited

U.S. PATENT DOCUMENTS 5,801,509 A * 9/1998 Sawa .................. H02P 6/16
  318/603
5,854,548 A * 12/1998 Taga ................... H02P 6/185
  318/400.12
(Continued)

FOREIGN PATENT DOCUMENTS

EP  2 693 628  2/2014
EP  2 790 316  10/2014
(Continued)

OTHER PUBLICATIONS

Korean Office Action dated Mar. 21, 2016 issued in Application No. 10-2015-0113422.
(Continued)

*Primary Examiner* — Paul Ip
(74) *Attorney, Agent, or Firm* — KED & Associates, LLP

(57) ABSTRACT

A motor driving apparatus included in a home appliance may include an inverter to convert a direct current (DC) power into an alternating current (AC) power through a switching operation and to output the converted AC power to a motor, an output current detector to detect an output current flowing through the motor, a controller to control the inverter, wherein, during a first interval after the motor stops, the controller controls a phase current of a predetermined frequency to flow through the motor to estimate a position of a rotor of the motor, and estimates the position of the rotor of the motor based on the detected output current while the phase current of the predetermined frequency flows through the motor. Thereby, the sensorless motor driving apparatus can easily estimate the position of the motor rotor.

12 Claims, 15 Drawing Sheets

(51) Int. Cl.
  *H02P 6/18* (2016.01)
  *H02P 6/20* (2016.01)
  *H02P 6/22* (2006.01)
  *H02P 27/06* (2006.01)

(58) Field of Classification Search
  CPC .......... H02P 27/06; H02P 21/18; H02P 21/24; H02P 21/26; H02P 2203/09; H02P 2207/05; H02P 6/20; H02P 21/00; H02P 21/0089
  USPC .................. 318/400.02, 400.12, 400.14, 466
  See application file for complete search history.

(56) References Cited

U.S. PATENT DOCUMENTS

| | | | | |
|---|---|---|---|---|
| 5,859,518 A * | 1/1999 | Vitunic | ................ | H02P 25/089 318/400.12 |
| 6,005,364 A * | 12/1999 | Acarnley | ................ | H02P 6/18 318/632 |
| 6,034,493 A | 3/2000 | Boyd et al. | | |
| 6,411,060 B1 * | 6/2002 | Jung | ................ | H02P 6/16 318/400.13 |
| 6,838,844 B2 * | 1/2005 | Shimizu | ................ | B62D 5/046 180/410 |
| 7,482,802 B2 * | 1/2009 | Finkler | ................ | H02P 6/16 318/466 |
| 7,772,790 B2 * | 8/2010 | Nashiki | ................ | H02K 1/145 318/400.02 |
| 8,054,030 B2 * | 11/2011 | Son | ................ | H02P 6/185 318/102 |
| 2003/0107339 A1 * | 6/2003 | Shimizu | ................ | B62D 5/046 318/434 |
| 2008/0129243 A1 * | 6/2008 | Nashiki | ................ | H02K 1/145 318/701 |
| 2008/0157708 A1 * | 7/2008 | Finkler | ................ | H02P 6/185 318/799 |
| 2008/0303516 A1 * | 12/2008 | Lamprecht | ................ | H02P 6/085 324/207.25 |
| 2009/0150027 A1 * | 6/2009 | Takamatsu | ................ | B62D 5/0457 701/41 |
| 2009/0160384 A1 * | 6/2009 | Mullin | ................ | H02P 3/08 318/400.34 |
| 2009/0164047 A1 * | 6/2009 | Hwang | ................ | H02P 23/0004 700/275 |
| 2009/0184678 A1 * | 7/2009 | Son | ................ | H02P 6/185 318/801 |
| 2010/0148753 A1 * | 6/2010 | Ha | ................ | H02M 7/53875 324/107 |
| 2010/0295492 A1 * | 11/2010 | Chakrabarti | ................ | B60L 3/0038 318/490 |
| 2011/0219816 A1 * | 9/2011 | Tanaka | ................ | H02P 6/18 62/498 |
| 2011/0291599 A1 * | 12/2011 | El-Antably | ................ | H02K 19/103 318/400.14 |
| 2012/0005840 A1 * | 1/2012 | Jang | ................ | D06F 33/02 8/137 |
| 2012/0006065 A1 * | 1/2012 | Jung | ................ | D06F 33/02 68/12.02 |
| 2012/0187878 A1 * | 7/2012 | Fukasaku | ................ | G01R 33/007 318/400.21 |
| 2012/0235610 A1 * | 9/2012 | Hisano | ................ | H02P 29/032 318/400.04 |
| 2013/0069572 A1 * | 3/2013 | Maekawa | ................ | H02P 21/26 318/400.14 |
| 2013/0082630 A1 * | 4/2013 | Purfuerst | ................ | H02P 6/18 318/400.32 |
| 2013/0214711 A1 * | 8/2013 | Omata | ................ | H02P 21/22 318/400.02 |
| 2013/0214712 A1 * | 8/2013 | Omata | ................ | H02P 21/22 318/400.02 |
| 2013/0271048 A1 * | 10/2013 | Iwashita | ................ | H02P 21/0046 318/400.02 |
| 2013/0278187 A1 * | 10/2013 | Suzuki | ................ | H02P 21/14 318/400.02 |
| 2013/0307452 A1 * | 11/2013 | Sonoda | ................ | H02P 6/18 318/400.32 |
| 2014/0225551 A1 * | 8/2014 | Omata | ................ | H02P 23/005 318/504 |
| 2014/0300309 A1 * | 10/2014 | Yoo | ................ | H02P 21/0017 318/801 |
| 2014/0375233 A1 * | 12/2014 | Blasko | ................ | H02P 21/0003 318/400.02 |
| 2014/0375235 A1 * | 12/2014 | Yamashita | ................ | H02P 21/05 318/400.02 |
| 2015/0002062 A1 * | 1/2015 | Kim | ................ | H02P 6/16 318/400.07 |
| 2015/0002064 A1 * | 1/2015 | Ko | ................ | H02P 6/18 318/400.32 |
| 2015/0075195 A1 * | 3/2015 | Suzuki | ................ | H02P 6/18 62/157 |
| 2015/0102758 A1 * | 4/2015 | Han | ................ | H02P 21/18 318/504 |
| 2015/0280619 A1 * | 10/2015 | Marohl | ................ | H02P 27/085 318/400.17 |
| 2015/0333686 A1 * | 11/2015 | Nakai | ................ | H02P 21/22 318/400.26 |
| 2016/0011009 A1 * | 1/2016 | Shimizu | ................ | G01R 19/0092 702/150 |
| 2017/0047875 A1 * | 2/2017 | Jang | ................ | H02P 6/183 |

FOREIGN PATENT DOCUMENTS

| | | |
|---|---|---|
| KR | 10-2006-0026706 | 3/2006 |
| KR | 10-2011-0090546 | 8/2011 |
| KR | 10-2014-0100339 | 8/2014 |
| KR | 10-2014-0121863 | 10/2014 |

OTHER PUBLICATIONS

Korean Notice of Allowance dated Jul. 26, 2016 issued in Application No. 10-2015-0113422.
European Search Report dated Jan. 19, 2017 issued in Application No. 16183489.0.

* cited by examiner

MOTOR DRIVING APPARATUS AND HOME APPLIANCE INCLUDING THE SAME

CROSS-REFERENCE TO RELATED APPLICATION

This application claims priority benefit under 35 U.S.C. § 119 to Korean Patent Application No. 10-2015-0113422, filed on Aug. 11, 2015, whose entire disclosure is hereby incorporated by reference.

BACKGROUND

1. Field

The present disclosure relates to a motor driving apparatus and a home appliance including the same and, more particularly, to a sensorless motor driving apparatus capable of easily estimating the position of a motor rotor and a home appliance including the same.

2. Background

A motor driving apparatus is an apparatus configured to drive a motor equipped with a rotor for rotational movement and a stator on which a coil is wound. Motor driving apparatuses may be divided into a sensor type motor driving apparatus which employs a sensor and a sensorless motor driving apparatus. Recently, sensorless motor driving apparatuses have been widely used for reasons such as reduction of manufacturing costs. Research has been conducted on sensorless motor driving apparatuses to ensure an efficient motor driving operation.

BRIEF DESCRIPTION OF THE DRAWINGS

The embodiments will be described in detail with reference to the following drawings in which like reference numerals refer to like elements wherein.

DETAILED DESCRIPTION

A motor driving apparatus described in this specification is an apparatus which is not provided with a position sensor such as a Hall sensor for sensing the position of the rotor of a motor, but is capable of estimating the position of the rotor of the motor in a sensorless manner. Hereinafter, a sensorless motor driving apparatus will be described. A motor driving apparatus according to an embodiment of the present disclosure may be referred to as a motor drive unit. As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
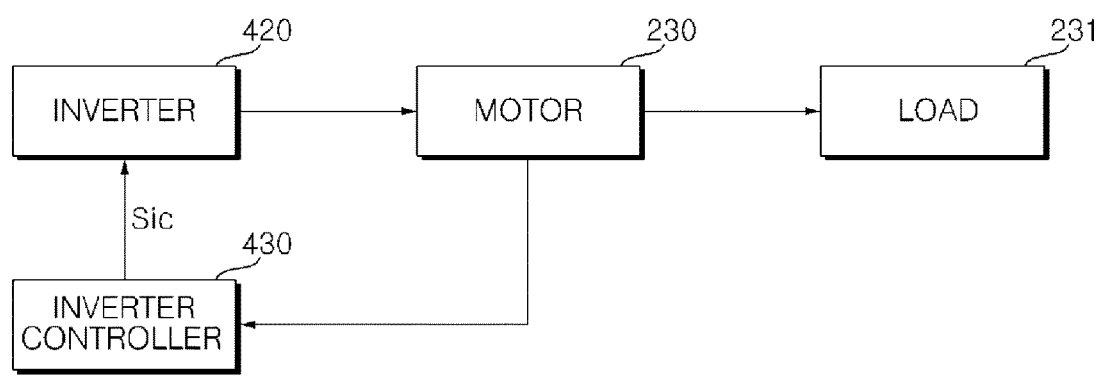
FIG. 1 is an internal block diagram illustrating a motor driving apparatus according to an embodiment of the present disclosure.
Figure 2:
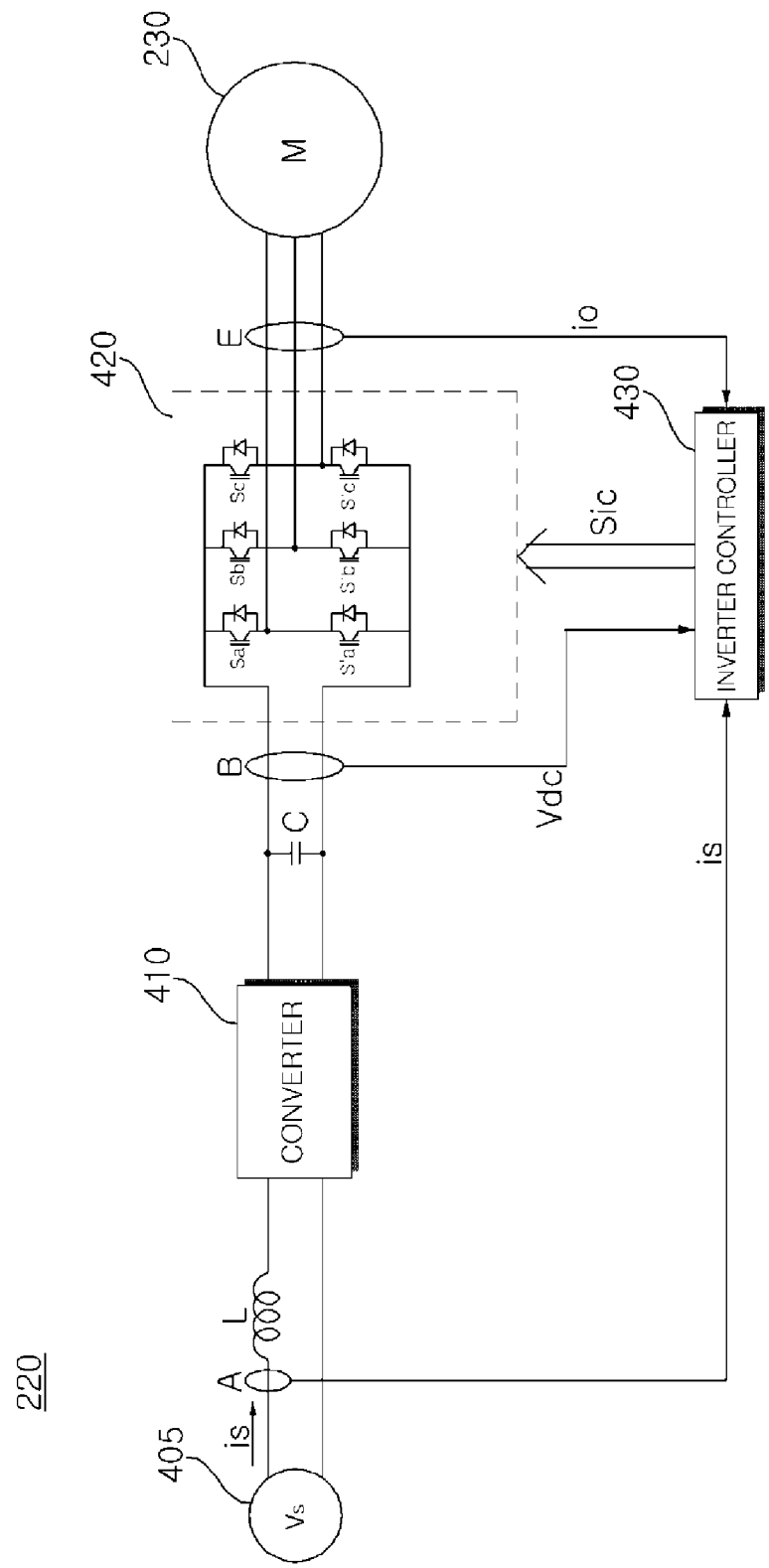
FIG. 2 is an internal circuit diagram illustrating the motor driving apparatus of FIG. 1.

FIG. 1 is an internal block diagram illustrating a motor driving apparatus according to an embodiment of the present disclosure, and FIG. 2 is an internal circuit diagram illustrating the motor driving apparatus of FIG. 1. Referring to FIGS. 1 and 2, the motor driving apparatus 220, which is configured to drive a motor in a sensorless manner, may include an inverter 420 and an inverter controller 430. The motor driving apparatus 220 may also include a converter 410, a DC link voltage detector B, a smoothing capacitor C, and an output current detector E. The drive unit 220 may further include an input current detector A and a reactor L.

According to an embodiment of the present disclosure, during a first interval after the motor 230 stops, the inverter controller 430 may control a phase current of a predetermined frequency to flow through the motor to estimate a position of a rotor of the motor, and estimates the position of the rotor of the motor 230 based on the detected output current while the phase current of the predetermined frequency flows through the motor 230. Thereby, the sensorless motor driving apparatus can easily estimate the position of the motor rotor.

During a second interval after the first interval, the inverter controller 430 may control a phase current of a predetermined level to flow through the motor 230 to align the rotor of the motor 230 at the estimated position of the rotor. The inverter controller 430 may control the frequency of the phase current applied to the motor 230 to increase after the second interval.

During the first interval, the inverter controller 430 may control a d-axis current command value of a first level with respect to a synchronization reference frame to be applied, extract a d-axis current with respect to the synchronization reference frame from the detected output current, and estimate the position of the rotor of the motor 230 based on a maximum d-axis current value of the d-axis current extracted during the first interval. During the second interval after the first interval, the inverter controller 430 may control a d-axis current command value of a second level and a d-axis current command value of a third level with respect to the synchronization reference frame to be sequentially applied to align the rotor of the motor 230 at the estimated position of the rotor, wherein the second level and the third level may be lower than the first level.

The inverter controller 430 may control a d-axis current command value of a fourth level with respect to the synchronization reference frame to be applied after the second interval, wherein the d-axis current command value of the fourth level may be level 0. During the first interval after the motor stops, the inverter controller 430 may control a phase current having a predetermined frequency and a predetermined magnitude to flow through the motor 230 to estimate the position of the rotor of the motor 230.

According to anther embodiment of the present disclosure, during a first interval after the motor stops, the inverter controller 430 may control a d-axis current command value of a first level with respect to a synchronization reference frame to be applied, extract a d-axis current with respect to the synchronization reference frame from the detected output current, and estimate a position of a rotor of the motor 230 based on the extracted d-axis current with respect to the synchronization reference frame. Thereby, the sensorless motor driving apparatus can easily estimate the position of the motor rotor.

Hereinafter, operations of respective constituent units in the motor driving apparatus 220 of FIGS. 1 and 2 will be described. The reactor L is disposed between a commercial AC power source 405 (vs) and the converter 410 to perform power factor correction or voltage boost. The reactor L may also function to restrict a harmonic current according to high-speed switching of the converter 410.

The input current detector A may detect input current Is that is input from the commercial AC power source 405. To this end, a current transformer (CT) or a shunt resistor may be used as the input current detector A. The detected input current Is, which is a discrete signal in the form of a pulse, may be input to the inverter controller 430.

The converter 410 converts the commercial AC power 405 applied via the reactor L into DC power and output the DC power. While the commercial AC power 405 is illustrated as a single-phase AC power, 3-phase AC power may be employed as the commercial AC power 405. The internal structure of the converter 410 depends on the type of the commercial AC power source 405.

The converter 410 may be configured by diodes without the switching device. In this case, the converter 410 may perform the rectification operation without performing a separate switching operation. For example, when the applied power is single-phase AC power, 4 diodes may be used in the form of a bridge. When the applied power is 3-phase AC power, 6 diodes may be used in the form of a bridge.

As the converter 410, a half-bridge converter formed by connecting, for example, 2 switching devices and 4 diodes may be used. When 3-phase AC power is employed, 6 switching devices and 6 diodes may be used. When the converter 410 is provided with switching devices, the converter 410 may perform voltage boost, power factor improvement and DC power conversion according to the switching operation of the switching devices.

The smoothing capacitor C smooths and stores input power. While, the figure illustrates that one smoothing capacitor C is used, a plurality of smoothing capacitors may be provided to secure device stability. While the smoothing capacitor C is illustrated as being connected to the output terminal of the converter 410, embodiments of the present disclosure are not limited thereto. DC power may be directly applied to the smoothing capacitor C. For example, DC power from a solar cell may be directly input to the smoothing capacitor C or input to the smoothing capacitor C via DC-DC conversion. Hereinafter, description will be given based on details shown in the figures.

As DC power is stored in the smoothing capacitor C, both ends of the smoothing capacitor C may be referred to as DC ends or DC link ends. The DC link voltage detector B may detect a DC link voltage Vdc between both ends of the smoothing capacitor C. To this end, the DC link voltage detector B may include a resistor device and an amplifier. The detected DC link voltage Vdc may be input to the inverter controller 430 as a discrete signal in the form of a pulse.

The inverter 420 may be provided with a plurality of inverter switching devices. Thereby, the inverter 420 may convert the rectified DC power Vdc into 3-phase AC powers Va, Vb, and Vc of predetermined frequencies according to turning on/off of the switching devices and output the converted powers to a 3-phase synchronous motor 230.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in an antiparallel manner.

Each of the switching devices in the inverter 420 is turned on/off based on an inverter switching control signal Sic from the inverter controller 430. Thereby, 3-phase AC power having a predetermined frequency is output to the 3-phase synchronous motor 230.

The inverter controller 430 may control the switching operation of the inverter 420 in a sensorless manner. To this end, the inverter controller 430 may receive an output current Io detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and output based on the output current Io detected by the output current detector E. The operation of outputting the inverter switching control signal Sic from the inverter controller 430 will be described in detail with reference to FIG. 3 later in this specification.

The output current detector E detects the output current Io flowing between the inverter 420 and the 3-phase motor 230. That is, the output current detector E detects current flowing to the motor 230. The output current detector E may detect all output currents Ia, Ib and Ic of the respective phases, or may detect output currents of two phases using 3-phase smoothing. The output current detector E may be positioned between the inverter 420 and the motor 230, and may employ a current transformer (CT), a shunt resistor, or the like to detect currents.

In using shunt resistors, three shunt resistors may be positioned between the inverter 420 and the synchronous motor 230, or ends of the shunt resistors may be connected to the three lower switching devices S'a, S'b and S'c of the inverter 420. It is also possible to use two shunt resistors based on 3-phase smoothing. When a single shunt resistor is employed, the shunt resistor may be disposed between the capacitor C and the inverter 420.

The detected output current Io may be a discrete signal in the form of a pulse and applied to the inverter controller 430. The inverter switching control signal Sic is generated based on the detected output current Io. In the following description, the output current Io may be illustrated as including 3-phase output currents Ia, Ib and Ic.

The 3-phase motor 230 includes a stator and a rotor. The rotor rotates when AC current of a phase of a predetermined frequency is applied to a coil of a corresponding phase (of a, b and c phases) of the stator.

The motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 3:
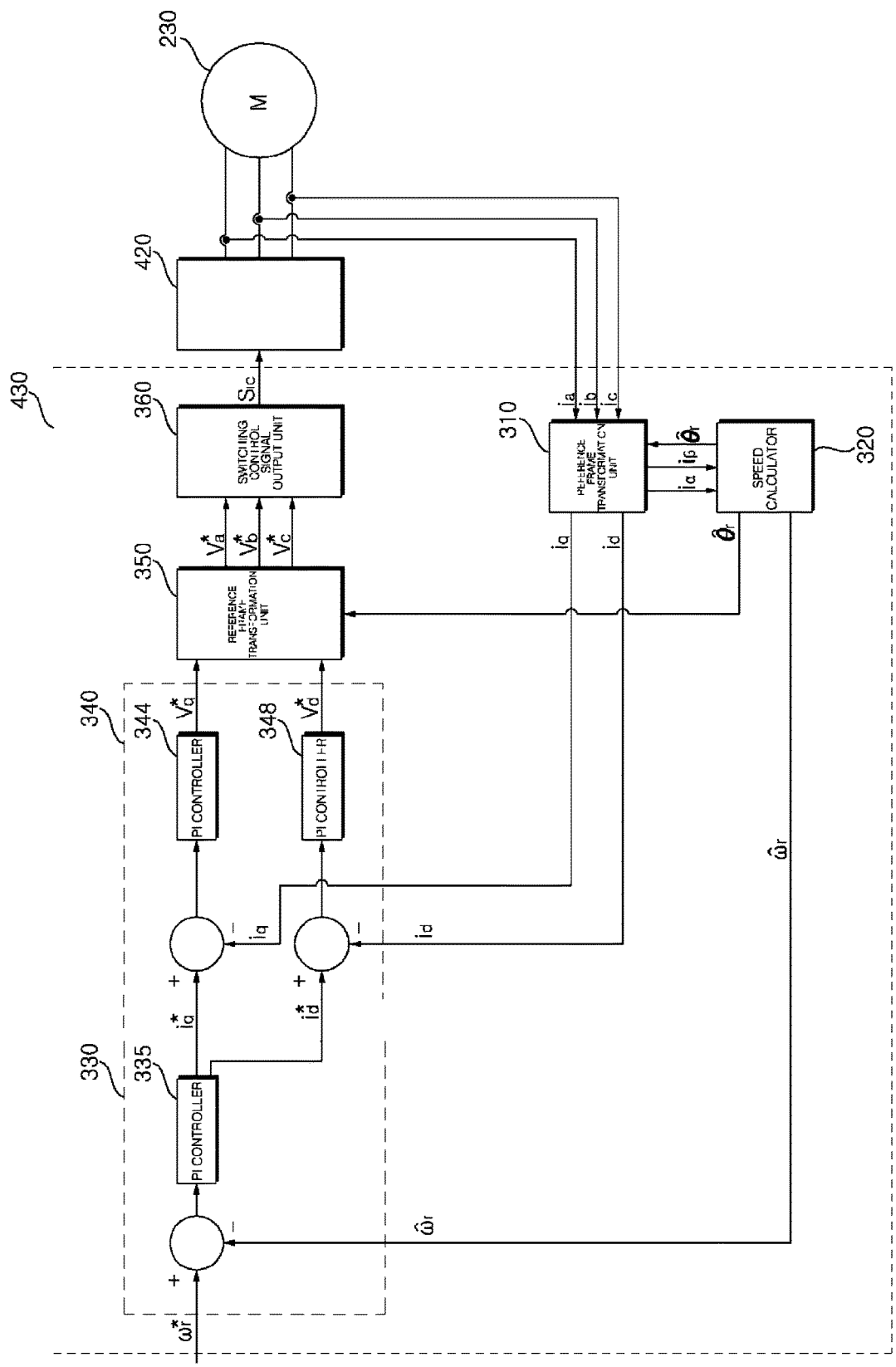
FIG. 3 is an internal block diagram illustrating the inverter controller of FIG. 2.

FIG. 3 is an internal block diagram illustrating an inverter controller of FIG. 2. Referring to FIG. 3, the inverter controller 430 may include a reference frame transformation unit 310, a speed calculator 320, a current command generator 330, a voltage command generator 340, a reference frame transformation unit 350, and a switching control signal output unit 360.

The reference frame transformation unit 310 receives the 3-phase output currents (Ia, Ib, Ic) detected by the output current detector E, and transforms the same into 2-phase currents (Iα, Iβ) in a stationary reference frame. The reference frame transformation unit 310 may transform 2-phase currents (Iα, Iβ) in the stationary reference frame to 2-phase currents (Id, Iq) In a rotating reference frame.

The speed calculator 320 may output a position $\hat{\theta}_r$ and a speed $\hat{\omega}_r$ calculated based on the 2 phase currents (IA, IB) of the stationary reference frame that are frame-transformed by the reference frame transformation unit 310.

The current command generator 330 generates a current command value I*q based on the calculated speed $\hat{\omega}_r$ and a speed command value ω*r. For example, the current command generator 330 may perform PI control in a PI controller 335 and generate the current command value I*q based on the difference between the calculated speed $\hat{\omega}_r$ and the speed command value ω*r. While FIG. 3 illustrates a q-axis current command value I*q as a current command value, a d-axis current command value I*d may also be generated. The d-axis current command value I*d may be set to 0. The current command generator 330 may further include a limiter (not shown) for limiting the level of the current command value I*q such that the current command value I*q does not exceed an allowable range.

Next, the voltage command generator 340 generates d-axis and q-axis voltage command values V*d and V*q based on the d-axis and q-axis currents Id and Iq which are transformed into currents in the 2-phase rotating reference frame by the reference frame transformation unit and the current command values I*d and I*q from the current command generator 330. For example, the voltage command generator 340 may perform PI control in a PI controller 344 and generate a q-axis voltage command value V*q based on the difference between the q-axis current iq and the q-axis current command value I*q. In addition, the voltage command generator 340 may perform PI control in a PI controller 348 and generate the d-axis voltage command value V*d based on the difference between the d-axis current Id and the d-axis current command value rd. The voltage command generator 340 may further include a limiter (not shown) for limiting the levels of the d-axis and q-axis voltage command values V*d and V*q such that the d-axis and q-axis voltage command values V*d and V*q do not exceed an allowable range.

The generated d-axis and q-axis voltage command values V*d and V*q are input to the reference frame transformation unit 350. The reference frame transformation unit 350 receives the position $\hat{\theta}_r$ calculated by the speed calculator 320 and the d-axis and q-axis voltage command values V*d and V*q and performs reference frame transformation.

The reference frame transformation unit 350 transforms a 2-phase rotating reference frame into a 2-phase stationary reference frame. The transformation may be performed using the position $\hat{\theta}_r$ calculated by the speed calculator 320.

The reference frame transformation unit 350 may also transform the 2-phase stationary reference frame into a 3-phase stationary reference frame. Through such transformation, the reference frame transformation unit 350 outputs 3-phase output voltage command values V*a, V*b, and V*c. The switching control signal output unit 360 outputs a PWM inverter switching control signal Sic based on the 3-phase output voltage command values V*a, V*b, and V*c.

The output inverter switching control signal Sic is transformed into a gate drive signal in a gate drive unit (not shown) and then input to the gate of each switching device in the inverter 420. Thereby, the switching devices Sa, S'a, Sb, S'b, Sc, and S'c in the inverter 420 perform the switching operation.

After the motor 230 stops, the inverter controller 430 may perform a control operation to apply a d-axis current command value of a first level with respect to a synchronization reference frame such that phase current of a certain frequency flows through the motor 230 to estimate the position of the rotor of the motor 230 in a first interval.

That is, in the first interval, a current command value output from the current command generator 330 may be a d-axis current command value of the first level with respect to the synchronization reference frame. The current command generator 330 may generate a d-axis voltage command value of the synchronization reference frame based on the d-axis current command value of the first level with respect to the synchronization reference frame.

In addition, the switching control signal output unit 360 may output a switching control signal such that a phase current of a certain frequency flows through the motor 230. Meanwhile, in the first interval, an output current detected by the output current detector E is transformed into a d-axis current and a q-axis current with respect to the synchronization reference frame by the reference frame transformation unit 310.

The speed calculator 320 may estimate the position of the rotor of the motor 230 in the first interval based on the d-axis current of the synchronization reference frame. Specifically, the speed calculator 320 extracts a d-axis current of the synchronization reference frame having the greatest value among the acquired d-axis currents of the synchronization reference frame, and estimates the position of the rotor based on the extracted d-axis current of the synchronization reference frame.

That is, in applying a d-axis current command value of the first level of the synchronization reference frame, a magnetic flux component current having the greatest value, i.e., a d-axis current of the synchronization coordinate system is detected at a position corresponding to the position of the rotor, and accordingly the speed calculator 320 estimates the position of the rotor using the detected current.

The speed calculator 320 may deliver the information related to the estimated position of the rotor to the current command generator 330. In the interval of alignment of the motor rotor after the interval of estimation of the position of the motor rotor, the current command generator 330 may generate a d-axis current command value of a second level with respect to the synchronization coordinate system for alignment of the motor rotor based on the information related to the estimated position of the rotor.

Alternatively, in the interval of alignment of the motor rotor after the interval of estimation of the position of the motor rotor, the current command generator 330 may sequentially generate d-axis current command values of the second level and third level with respect to the synchronization coordinate system for alignment of the motor rotor based on the information related to the estimated position of the rotor.

In the interval of motor acceleration or the interval of normal operation of the motor which follows the alignment interval, the current command generator 330 may generate a d-axis current command value of a fourth level with respect to the synchronization reference frame. Herein, the fourth level may be level 0. That is, in the interval of motor acceleration or normal operation of the motor following the alignment interval, the current command generator 330 may generate a q-axis current command value, which corresponds to a current command value of a torque component, without generating a d-axis current command value. Thereby, the rate of rotation of the motor 230 increases in the motor acceleration interval, or varies in the interval of normal operation of the motor.

Figure 4A:
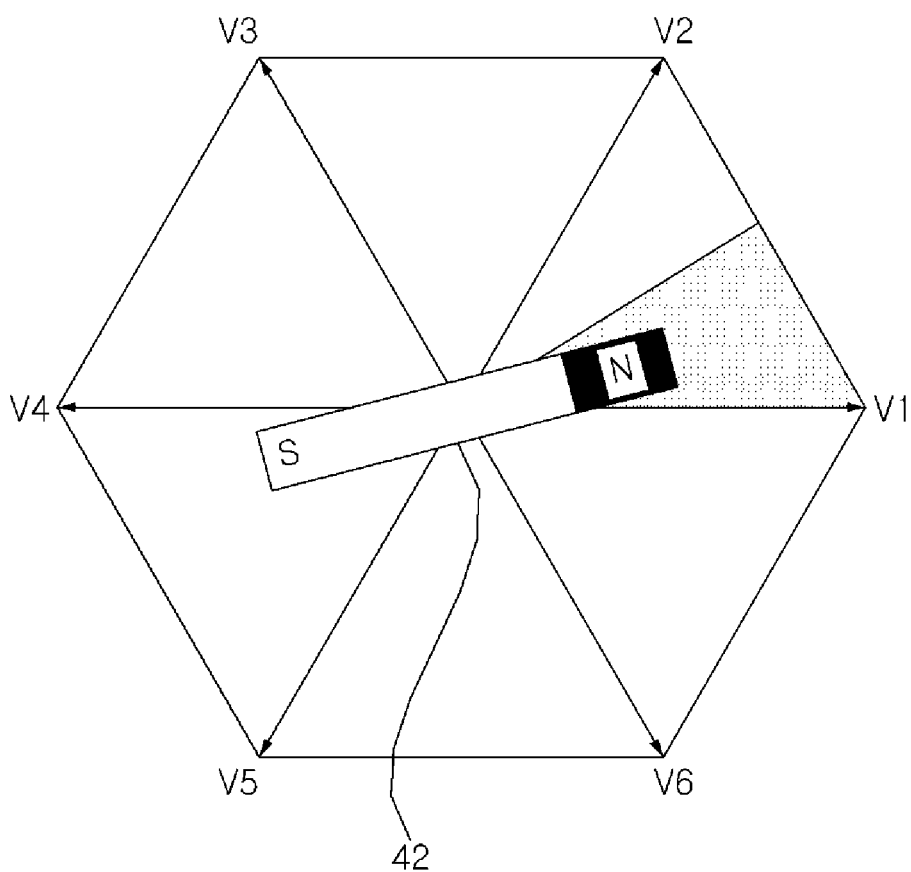
FIGS. 4A and 4B illustrate a method for estimating a motor rotor.
Figure 4B:
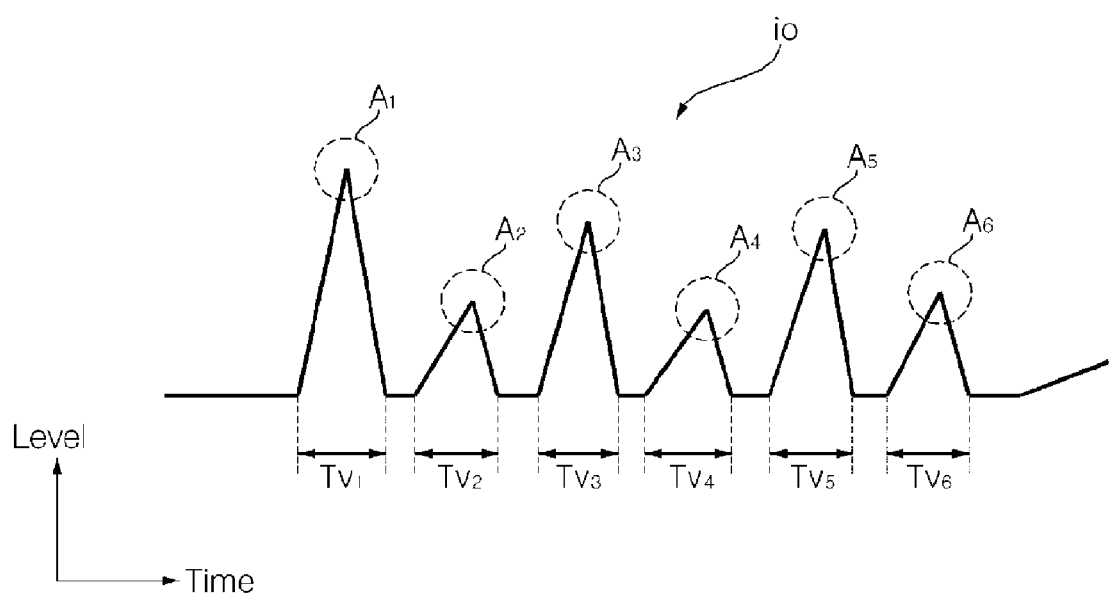

FIGS. 4A and 4B illustrate a method for estimating a motor rotor. FIG. 4A illustrates space vectors for motor control. In controlling the motor according to space vector-based pulse width modulation (SVPWM), control of driving of the motor 230 may be performed using basic vectors, first to sixth vectors V1 to V6, as shown in FIG. 4A.

Conventionally, currents corresponding to the basic vectors, i.e. the first to sixth vectors V1 to V6, are applied to the motor 230 to estimate the initial position of the rotor of the motor 230. Then, after the basic vectors of the first to sixth vectors V1 to V6 are applied, the position of the rotor 42 is estimated based on the waveform of current flowing through the motor 230.

FIG. 4B illustrates the waveform of current flowing through the motor 230 in accordance with the basic vectors of the first to sixth vectors V1 to V6. When the basic vectors of the first to sixth vectors V1 to V6 are distributed to and applied at first to sixth times Tv1 to Tv6 to estimate the initial rotor position of the motor 230, currents corresponding to the base vectors of the first to sixth vectors V1 to V6 are generated as shown in FIG. 4B. Particularly, the respective component currents have peak current components A1 to A6.

Meanwhile, noise is caused in the motor 230 by the peak current components A1 to A6. Particularly, high-frequency components cause offensive noise.

Since the basic vectors of the first to sixth vectors V1 to V6 should be sequentially applied, a considerable amount of time is taken to apply the vectors.

According to an embodiment of the present disclosure, in order to address the problems of noise and need of the considerable amount of time, a control operation is performed in the first interval to let phase current of a certain frequency flow through the motor 230 in the first interval after the motor 230 stops in order to estimate the position of the rotor of the motor 230. That is, after the motor stops, a control operation is performed to apply a d-axis current command value of a first level with respect to the synchronization reference frame.

Continuously applying the d-axis current command value of the first level with respect to the synchronization reference frame in this manner prevents occurrence of a peak value in the current flowing through the motor 230 and attenuates noise. In addition, since phase current of a certain frequency corresponding to one period of rotation of the motor 230 flows, time taken to estimate the position of the rotor is considerably reduced. More details will be described below with reference to FIG. 5.

Figure 5:
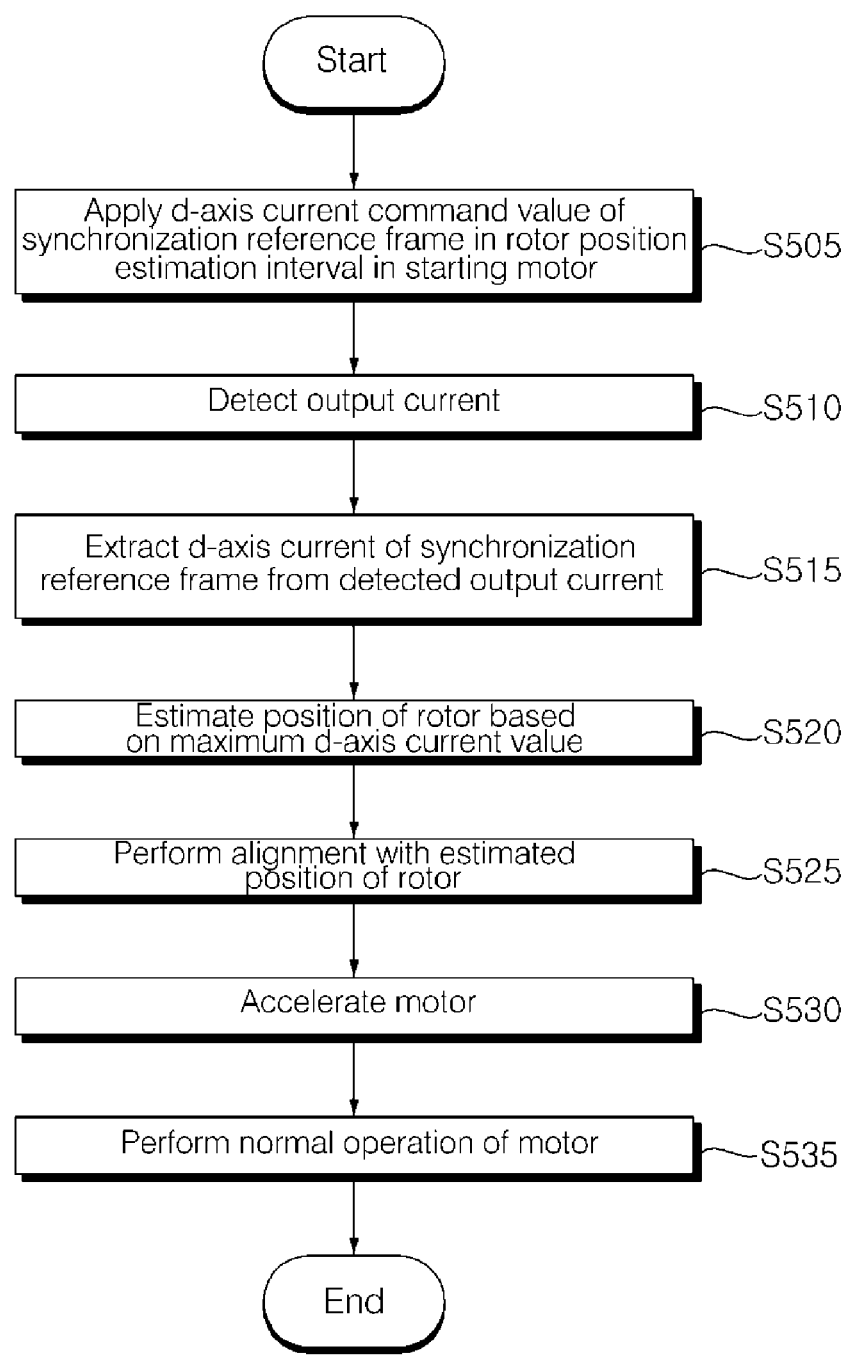
FIG. 5 is a flowchart illustrating operation of a motor driving apparatus according to an embodiment of the present disclosure.
Figure 6:
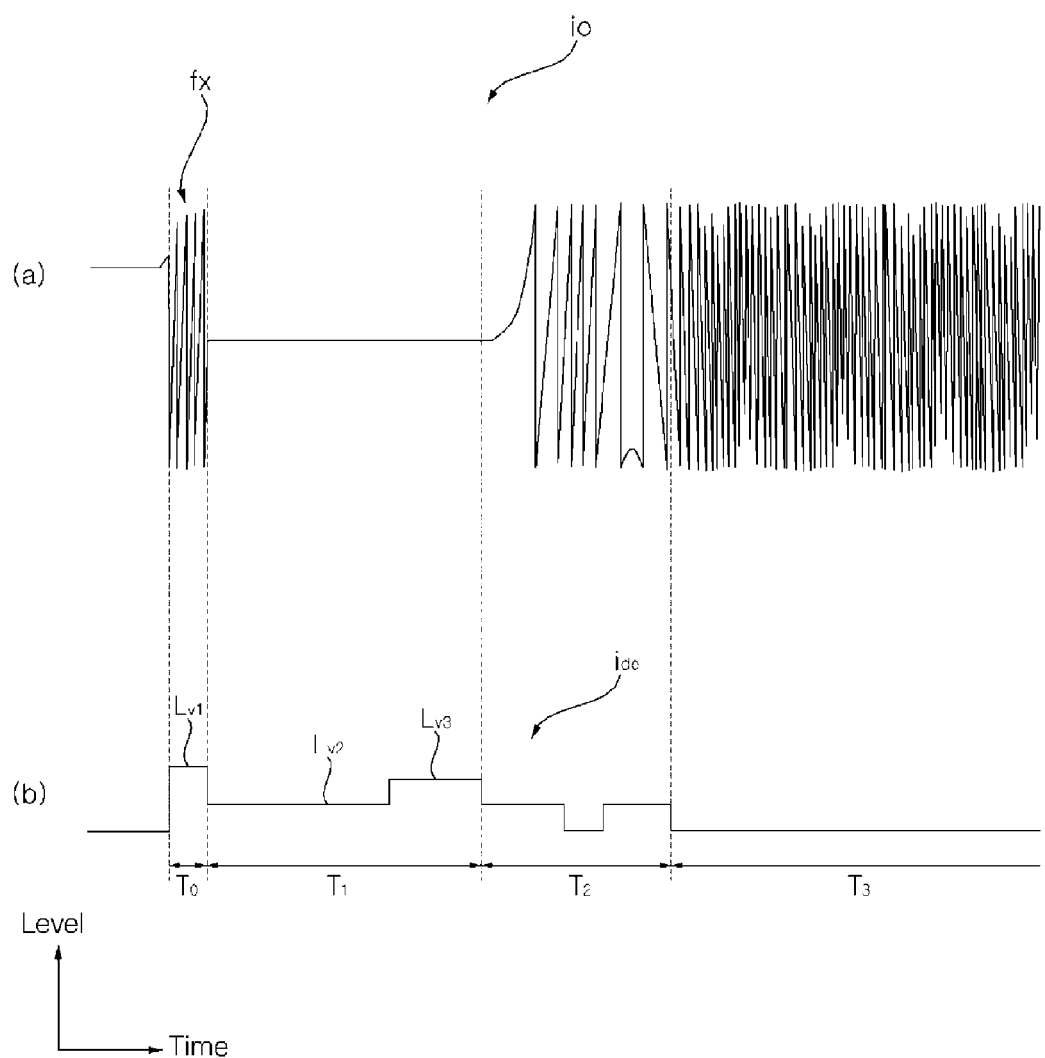
FIGS. 6 to 8 illustrate the operation of FIG. 5.
Figure 7A:
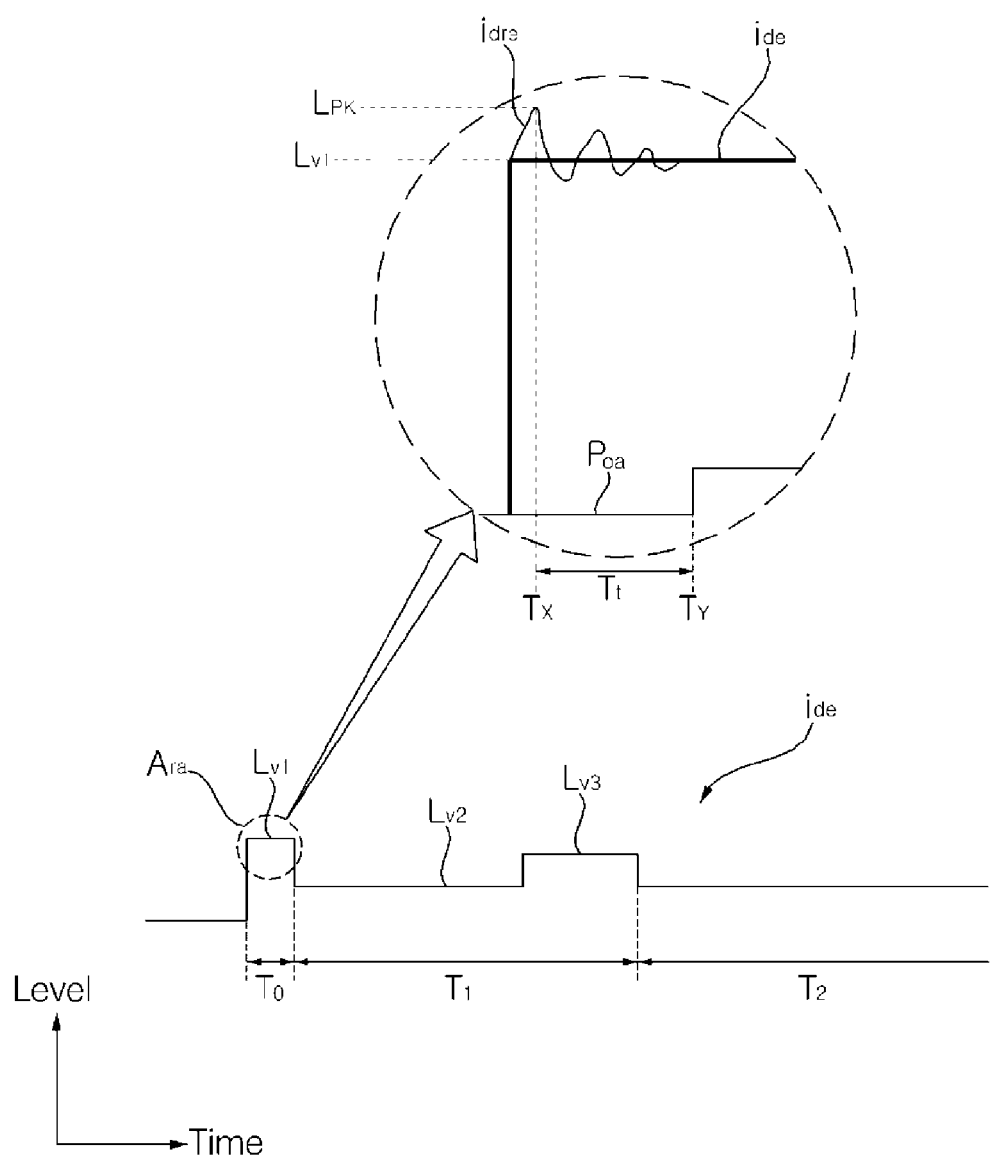
Figure 7B:
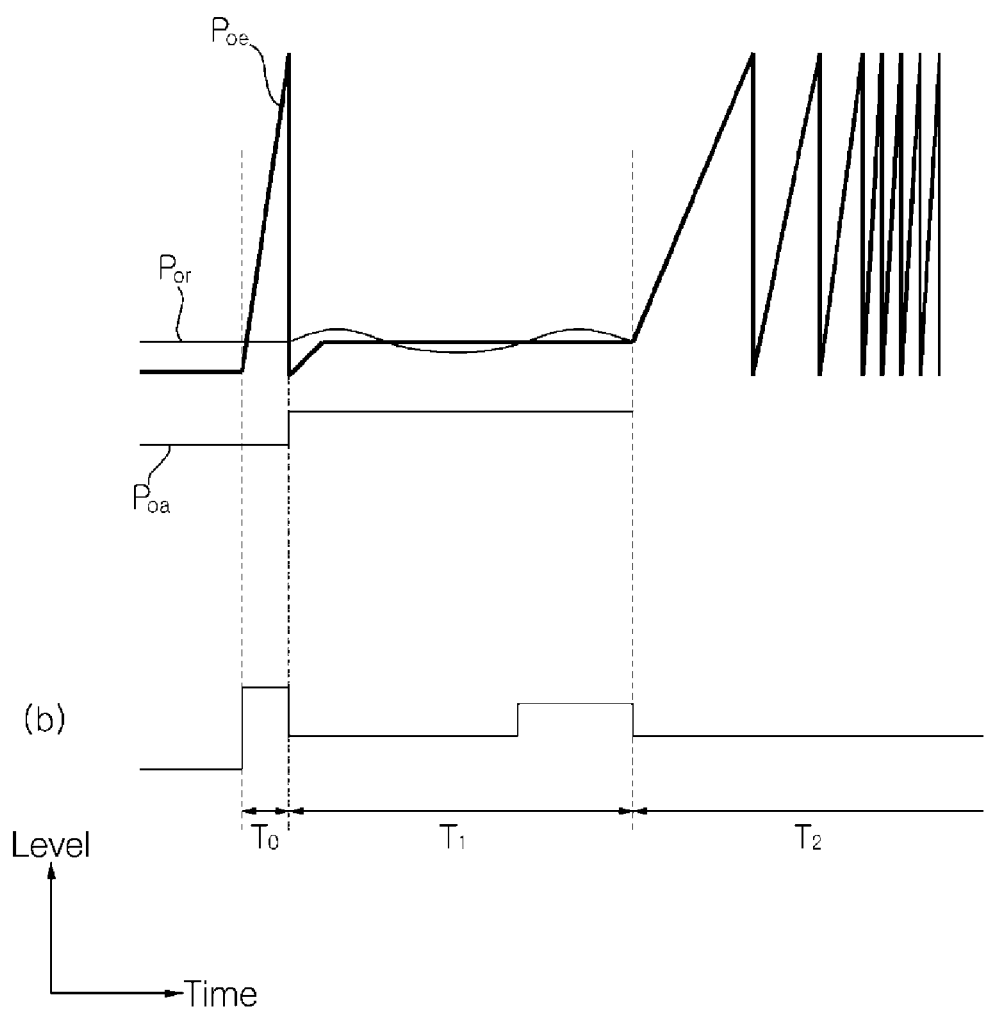
Figure 8:
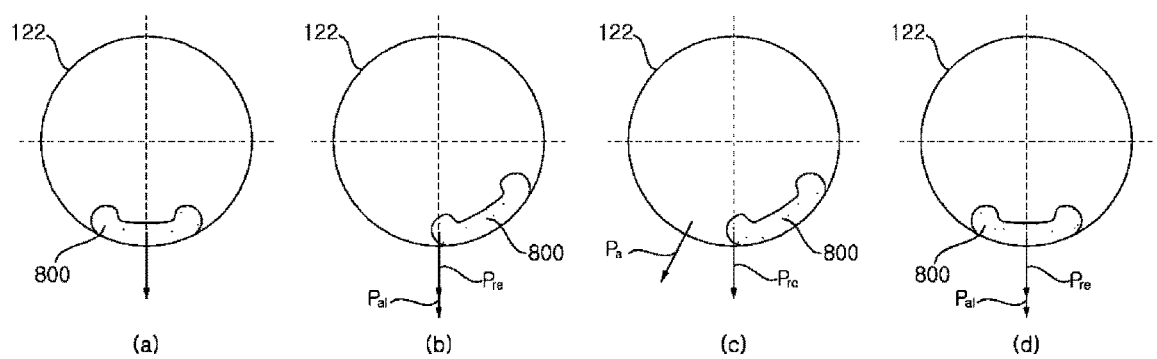

FIG. 5 is a flowchart illustrating operation of a motor driving apparatus according to an embodiment of the present disclosure, and FIGS. 6 to 8 illustrate the operation of FIG. 5. Referring to FIGS. 5 to 8, after the motor 230 stops, the inverter controller 430 applies a d-axis current command value of a first level with respect to the synchronization reference frame during a first interval To, i.e., an interval of estimation of the rotor position in order to start the motor (S505).

FIG. 6(b) illustrates the waveform Ide of an exemplary d-axis current command value. Referring to FIG. 6 (b), a d-axis current command value LV1 of a first level with respect to the synchronization reference frame is applied during a first interval To, i.e., the interval of estimation of the rotor position.

FIG. 6(a) illustrates the waveform Io of phase current flowing through the motor 230. Referring to FIG. 6(a), in the first interval To, phase current Io of a certain frequency Fx is applied to the motor 230. Particularly, a current Io of a certain frequency Fx and a certain magnitude is applied to the motor 230.

Then, the output current detector E detects the output current in the first interval To (S510). The detected output current Io is delivered to the inverter controller 430. The inverter controller 430 may perform sampling of the detected output current Io. Then, the motor controller 430 extracts a d-axis current with respect to the synchronization reference frame based on the detected output current Io, particularly based on the sampled output current Io (S515).

As described above, the reference frame transformation unit 310 transforms the detected output current Io into a d-axis current and a q-axis current, which are based on the synchronization reference frame, and extracts the d-axis current from the transformed currents. Then, the inverter controller 430 estimates the position of the rotor of the motor 230 based on the maximum d-axis current value of the extracted d-axis current (S520). The inverter controller 430 assumes that the rotor is located at a position corresponding to the maximum d-axis current value.

As described above, the speed calculator 320 may estimate the position of the rotor of the motor 230 based on the d-axis current with respect to the synchronization reference frame in the first interval. Specifically, the speed calculator 320 extracts a d-axis current component having the greatest value from the acquired d-axis current with respect to the synchronization reference frame in the first interval, and then estimates the position of the rotor based on the extracted d-axis current of the synchronization reference frame. That is, in applying a d-axis current command value of the first level of the synchronization reference frame, magnetic flux current of the greatest value, i.e., a d-axis current of the synchronization reference frame, is detected at a position corresponding to the position of the rotor, and accordingly the speed calculator 320 estimates the position of the rotor using the detected current.

The speed calculator 320 may deliver the information related to the estimated position of the rotor to the current command generator 330. Then, the inverter controller 430 may perform a control operation such that alignment with the estimated position of the rotor is performed (S525). In the interval T1 of alignment of the motor rotor after the interval To of estimation of the position of the motor rotor, the current command generator 330 may generate a d-axis current command value of a second level with respect to the synchronization reference frame for alignment of the motor rotor based on the information related to the estimated position of the rotor.

Alternatively, in the interval of alignment of the motor rotor after the interval of estimation of the position of the motor rotor, the current command generator 330 may sequentially generate d-axis current command values of the second level and third level with respect to the synchronization reference frame for alignment of the motor rotor based on the information related to the estimated position of the rotor.

Referring to FIG. 6(b), d-axis current command values of the second level LV2 and the third level LV3 with respect to the synchronization reference frame are sequentially applied in a second interval T1, namely the interval of motor alignment.

Preferably, the second level LV2 and the third level LV3 are lower than the first level LV1.

A d-axis current command value of a higher level is preferably used to estimate the initial rotor position. The d-axis current command values of the second level LV2 and the third level LV3 which are lower than the first level alone are sufficient for execution of the alignment operation after estimation of the rotor position.

Meanwhile, in order to calculate inductance, resistance or back electromotive force, which is a motor constant, the second level LV2 and the third level LV3 are preferably set to be different from each other. The phase current flowing through the motor 230 in the second interval T1 may be 0 as in the case of FIG. 6(a).

Next, the inverter controller 430 controls the motor 230 to accelerate in a motor acceleration interval T2 which is a third interval (S530). Next, the inverter controller 430 controls the motor 230 to normally operate in an interval T3 of normal operation of the motor which is a fourth interval (S535). The current command generator 330 may generate a d-axis current command value of a fourth level LV4 with respect to the reference frame in the interval T2 of motor acceleration or the interval T3 of normal operation of the motor which follows the alignment interval T1. Herein, the fourth level LV4 may be level 0.

That is, in the interval T2 of motor acceleration or the interval T3 of normal operation of the motor which follows the alignment interval, the current command generator 330 may generate a q-axis current command value, which corresponds to a current command value of a torque component, without generating a d-axis current command value. Thereby, the rate of rotation of the motor 230 increases in the motor acceleration interval, or varies in the interval of normal operation of the motor.

FIG. 6(a) illustrates increase of the frequency of phase current in the motor acceleration interval T2 and variation of the frequency of the phase current in the interval T3 of normal operation of the motor. According to this example, the rate of rotation of the motor 230 increases in the motor acceleration interval, or varies in the interval of normal operation of the motor.

FIG. 7A is an enlarged view of the first interval To of FIG. 6. When the inverter controller 430 applies a d-axis current command value of the first level LV1 with respect to the synchronization reference frame in the first interval To, the waveform Idrc of the d-axis current transformed based on the output current Io flowing through the motor 230 may appear in the form of a sine wave that shrinks gradually, as shown in FIG. 7A.

The greatest de-current value appears at time Tx, and then the current gradually decreases. In the case that the inverter controller 430 samples the output current Io during the period Tt, which is a control period, the inverter controller 430 estimates the position of the rotor using time Tx at which the greatest d-axis current value is obtained.

The inverter controller 430 reflects the estimated position of the rotor in the next control period. That is, calculation is performed at time Ty assuming that the position of the rotor is changed. Thereby, the inverter controller 430 performs a control operation in the next period to perform alignment of the estimated position of the rotor.

Herein, Poa denotes the alignment position of the motor. FIG. 7A illustrates that the alignment position changes at time Ty.

FIG. 7B illustrates comparison between the estimated rotor position Poe and the real rotor position Por. In the first interval To, the rotor position Poe is estimated by the applied d-axis current command value of the first level with respect to the synchronization reference frame. In this figure, the rotor position Poe estimated in the first interval To is illustrated as continuously changing from the electrical angle of 0° of the motor to the electrical angle of 360°.

The motor controller 430 estimates a first angle between the electric angle of 0° of the motor and the electrical angle of 360° as the rotor position based on the greatest d-axis current value of the d-axis current with respect to the synchronization reference frame according to the output current Io. Then, the inverter controller 430 performs alignment such that the rotor of the motor is arranged at the estimated position in the second interval T1. In FIG. 7B, the estimated rotor position Poe is illustrated as having a constant angular value in the second interval T1. Next, as the rotor rotates from the third interval T2 which is an acceleration interval, the estimated rotor position Poe changes continuously and repeatedly from the electrical angle of 0° to the electrical angle of 360°.

Meanwhile, the real rotor position Por, which corresponds to the first angle between the electrical angle of 0° of the motor and the electrical angle of 360° in the first interval To, is slightly changed with respect to the first angle, but is aligned with the first angle by the alignment current, namely the d-axis current command value of the second level with respect to the synchronization reference frame in the second interval T1.

Then, similar to the estimated rotor position Poe, the real rotor position Por changes continuously and repeatedly from the electrical angle of 0° to the electrical angle of 360°, beginning in the third interval T2 which is the acceleration interval.

In FIG. 7B, Poa denotes the alignment position of the motor. In the figure, the electrical angle of the motor corresponding to the alignment position is illustrated as being 0° in the first interval To and being changed to a first angle in the second interval T1.

The motor driving apparatus 220 may be employed by various apparatuses. For example, the motor driving apparatus 220 may be employed by home appliances such as a laundry treating appliance, an air conditioner, a refrigerator, a water purifier, and a cleaner. The motor driving apparatus 220 may also be applied to, for example, a vehicle, a robot and a drone which can be driven by a motor.

FIGS. 8A-8D illustrate laundry 800 arranged in relation to a washtub 122 in a laundry treating appliance. FIG. 8(a) shows an initial rotor position at which the laundry which is aligned with the direction of gravity.

FIG. 8(b) illustrates an example of alignment of the rotor through the alignment operation. In this example, both the alignment position of the rotor and the real portion of the rotor are aligned with the direction of gravity with the laundry 800 positioned on the right side. In this case, since the alignment position of the rotor is identical to the real portion of the rotor, an initial angular error is not produced.

FIG. 8(c) illustrates another example of alignment of the rotor through the alignment operation. In this example, the alignment position of the rotor is arranged on the left side, while the real position of the rotor is in the direction of gravity and the laundry 800 is positioned on the right side.

In this case, the alignment position of the rotor is not identical to the real position of the rotor, and thus an initial angular error is produced.

In the examples of FIGS. 8(b) and 8(c), the position of the laundry 800 is different from the real position of the rotor, and thus the laundry appears to have a wide distribution. According to the method for estimating the initial position of the rotor of the present disclosure and the corresponding alignment operation, the alignment position of the rotor, the real position of the rotor and the position of the laundry 800 are all identical as illustrated in FIG. 8(d). Particularly, all the positions are identically arranged in the direction of gravity as illustrated in FIG. 8(d).

Therefore, since the alignment position of the rotor is identical to the real position of the rotor, an initial angular error is not produced. In addition, since the position of the laundry 800 is identical to the real position of the rotor, the laundry appears to have a narrow distribution.

Figure 9:
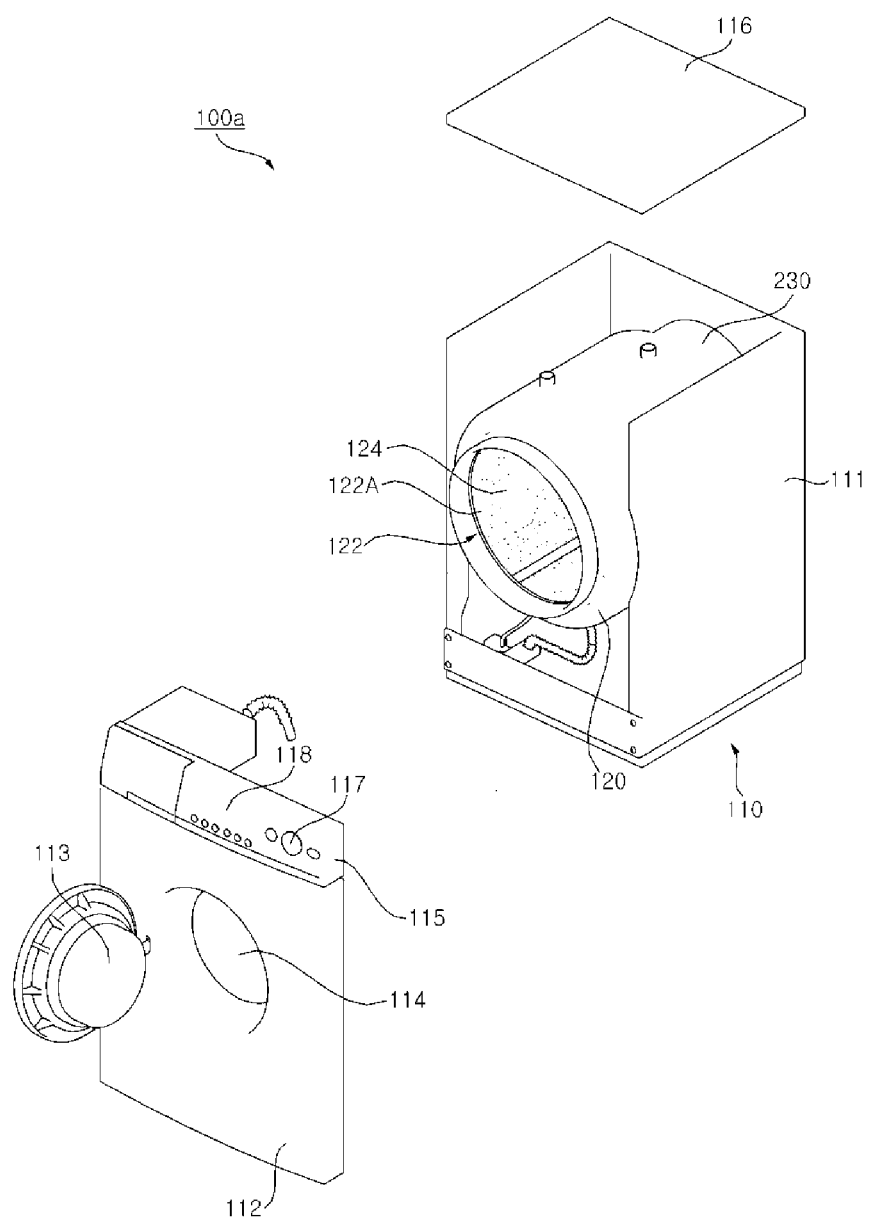
FIG. 9 is a perspective view illustrating a laundry treating appliance which is an exemplary home appliance according to an embodiment of the present disclosure.

FIG. 9 is a perspective view illustrating a laundry treating appliance according to an embodiment of the present disclosure. Referring to FIG. 9, a laundry treating appliance 100a is a front-loading laundry treating appliance wherein laundry is inserted from the front into a washtub. The front-loading laundry treating appliance conceptually includes a washing machine for performing the operations of washing, rinsing and drying of inserted laundry or a dryer for drying inserted wet laundry. Hereinafter, description will be given focusing on the washing machine.

The laundry treating appliance 100a of FIG. 9, which is a washtub-based laundry treating appliance, includes a cabinet 110 defining the exterior of the laundry treating appliance 100a, a tub 120 disposed inside the cabinet 110 and supported by the cabinet 110, a washtub 122 which is disposed inside the tub 120 and in which laundry is washed, a motor 130 for driving the washtub 122, and a wash water supplier (not shown) disposed outside a cabinet body 111 to supply wash water into the cabinet 110, and a drainage unit (not shown) formed on the lower side of the tub 120 to discharge wash water outward.

The washtub 122 is provided with a plurality of through holes 122A allowing wash water to pass therethrough. A lifter 124 may be disposed on the inner surface of the washtub 122 to lift the laundry to a certain height during rotation such that the laundry drops due to gravity.

The cabinet 110 includes the cabinet body 111, a cabinet cover 112 disposed on and connected to the front surface of the cabinet body 111, a control panel 115 disposed on the upper side of the cabinet cover 112 and connected to the cabinet body 111, and a top plate 116 disposed on the upper side of the control panel 115 and connected to the cabinet body 111. The cabinet cover 112 includes a laundry introduction hole 114 formed to allow introduction and retrieval of laundry therethrough and a door 113 disposed to be horizontally rotatable to open and close the laundry introduction hole 114.

The control panel 115 includes manipulation keys 117 for controlling the operation status of the laundry treating appliance 100a and a display unit 118 disposed on one side of the manipulation keys 117 to display the operation status of the laundry treating appliance 100a. The manipulation keys 117 and the display unit 118 in the control panel 115 are electrically connected to a controller (not shown). The controller (not shown) electrically controls respective constituents of the laundry treating appliance 100a. Operation of the controller (not shown) will be described later.

The washtub 122 may be provided with an auto-balancer (not shown). The auto-balancer (not shown), which serves to attenuate vibration caused by maldistribution of laundry contained in the washtub 122, may be implemented by, for example, a liquid balancer or a ball balancer. Although not shown in FIG. 9, the laundry treating appliance 100a may further include a vibration sensor for measuring the degree of vibration of the washtub 122 or the cabinet 110.

Figure 10:
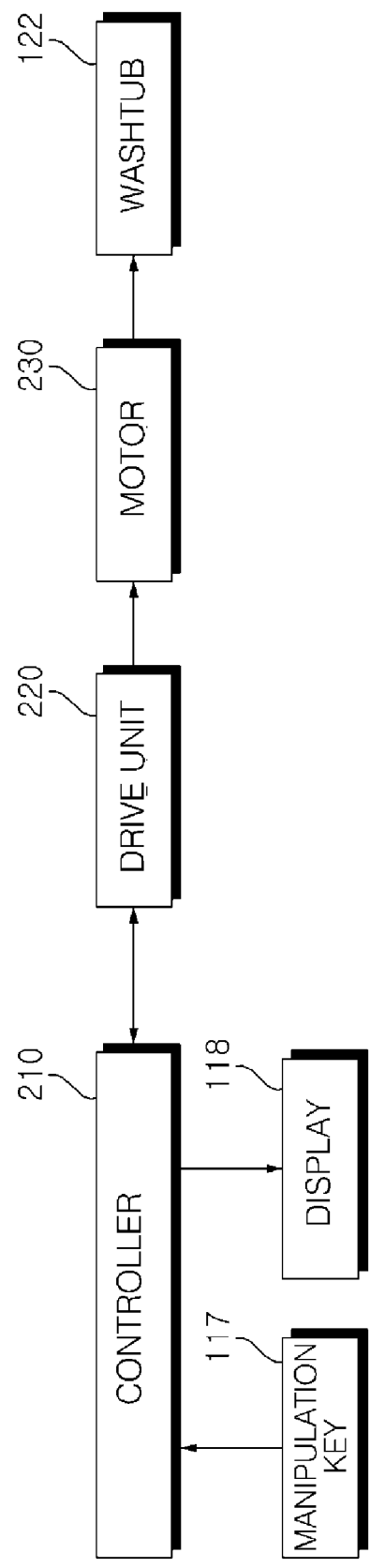
FIG. 10 is an internal block diagram of the laundry treating appliance of FIG. 9.

FIG. 10 is an internal block diagram of the laundry treating appliance of FIG. 9. Referring to FIG. 10, in the laundry treating appliance 100a, the drive unit 220 is controlled by a controller 210. The drive unit 220 drives the motor 230. Thereby, the washtub 122 is rotated by the motor 230.

The controller 210 operates according to an operation signal received from the manipulation key 117. Thereby, washing, rinsing and drying may be performed. In addition, the controller 210 may control the display 118 to display a washing mode, a washing time, a drying time, a rinsing time, or the current operation status.

The controller 210 controls the drive unit 220 to operate the motor 230. In this case, a position sensor for sensing the position of the rotor of the motor 230 is not provided to the interior or exterior of the motor 230. That is, the drive unit 220 controls the motor 230 in a sensorless manner.

The drive unit 220, which serves to drive the motor 230, may include an inverter (not shown), an inverter controller (not shown), an output current detector E (see FIG. 2) for detecting an output current flowing through the motor 230, and an output voltage detector F (see FIG. 2) for detecting an output voltage Vo applied to the motor 230. The drive unit 220 may conceptually further include a converter for supplying DC power to be input to the inverter (not shown).

For example, the inverter controller 430 (see FIG. 2) estimates the position of the rotor of the motor 230 based on an output current Io and the output voltage Vo. Then, the drive unit 220 controls the motor 230 based on the estimated position of the rotor such that the motor 230 rotates.

Specifically, when the inverter controller 430 (see FIG. 2) generates a PWM switching control signal (Sic of FIG. 2) based on the output current Io and the output voltage Vo and outputs the same to the inverter (not shown), the inverter (not shown) supplies AC power of a predetermined frequency to the motor 230. Then, the motor 230 is caused to rotate by the AC power of the predetermined frequency. The drive unit 220 may correspond to the motor driving apparatus 220 of FIG. 1.

The controller 210 may sense the amount of laundry based on, for example, the output current Io flowing through the motor 230. For example, while the washtub 122 is rotating, the controller 210 may sense the amount of laundry based on the current value Io of the motor 230.

Particularly, the controller 210 may accurately sense the amount of laundry using the rotor resistance and inductance of the motor measured in a motor alignment interval. The controller 210 may sense the degree of maldistribution of the washtub 122, i.e., unbalance (UB) of the washtub 122. Sensing the degree of maldistribution may be performed based on a ripple component of the output current Io flowing through the motor 230 or the amount of change in the rate of rotation of the washtub 122. Particularly, the controller 210 may accurately sense the amount of laundry using the rotor resistance and inductance of the motor measured in a motor alignment interval.

Figure 11:
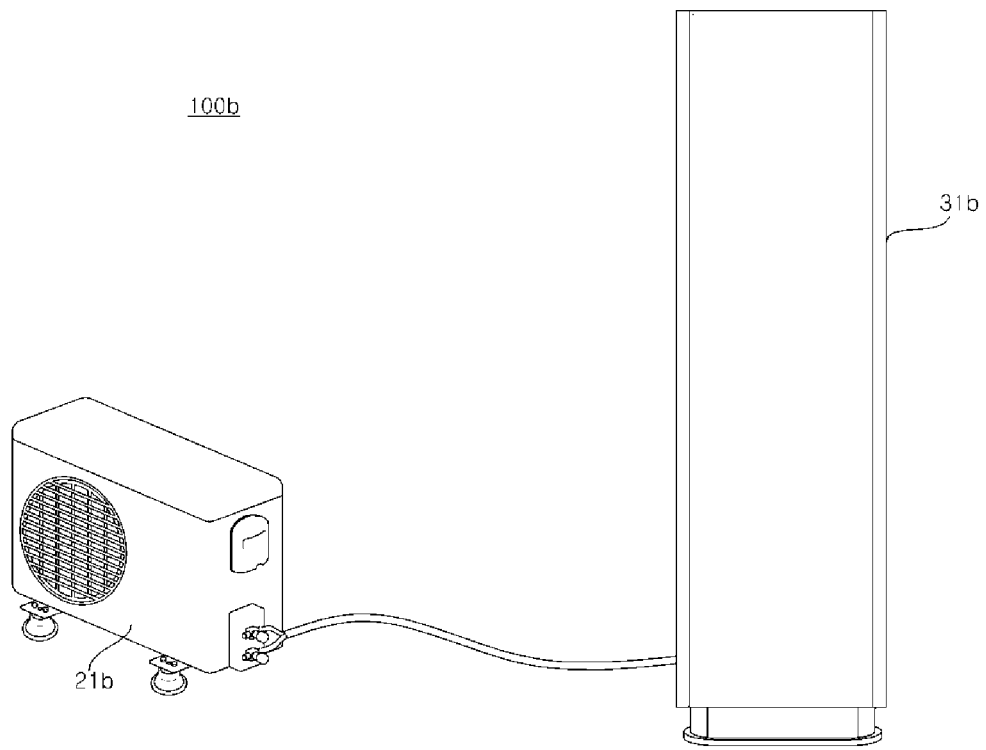
FIG. 11 is a view illustrating configuration of an air conditioner which is another exemplary home appliance according to an embodiment of the present disclosure.

FIG. 11 is a view illustrating configuration of an air conditioner which is another exemplary home appliance according to an embodiment of the present disclosure. According to an embodiment, the air conditioner 100b may include an indoor unit 31*b* and an outdoor unit 21*b* connected to the indoor unit 31*b*, as shown in FIG. 11.

As the indoor unit 31*b*, any one of a standing indoor unit, a wall-mounted indoor unit and a ceiling-mounted indoor unit may be employed. In FIG. 11, the indoor unit 31*b* is a standing indoor unit. The air conditioner 100*b* may further include at least one of a ventilator, an air cleaner, a humidifier and a heater, which may operate in connection with operations of the indoor unit and the outdoor unit.

The outdoor unit 21*b* includes a compressor (not shown) for compressing a refrigerant supplied thereto, an outdoor heat exchanger (not shown) causing heat exchange between the refrigerant and the outdoor air, an accumulator (not shown) for extracting a gaseous refrigerant from the supplied refrigerant and supplying the same to the compressor, and a 4-way valve (not shown) for selecting a flow path of the refrigerant according to the heating operation. The outdoor unit 21*b* further includes a plurality of sensors, a valve and an oil collector, which will not be described below.

The outdoor unit 21*b* operates the compressor and the outdoor heat exchanger provided to the outdoor unit 21*b* to compress the refrigerant or cause heat exchange according to the settings to supply the refrigerant to the indoor unit 31*b*. The outdoor unit 21*b* may be driven by a remote controller (not shown) or according to a request from the indoor unit 31*b*. As the cooling/heating capacity depends on the indoor unit, the number of operations of the outdoor unit and the number of operations of the compressor installed in the outdoor unit are changeable. The outdoor unit 21*b* supplies the compressed refrigerant to the indoor unit 31*b* connected thereto.

The indoor unit 31*b* receives the refrigerant from the outdoor unit 21*b* and discharges cooled air to the indoor space. The indoor unit 31*b* includes an indoor heat exchanger (not shown), an indoor unit fan (not shown), an expansion valve (not shown) for expanding the supplied refrigerant, and multiple sensors (not shown).

The outdoor unit 21*b* and the indoor unit 31*b* are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to the indoor unit 31*b* to input a control command of the user to the indoor unit. The remote control may receive and display the status information about the indoor unit. The remote control may communicate with the indoor unit by wire or wirelessly.

Figure 12:
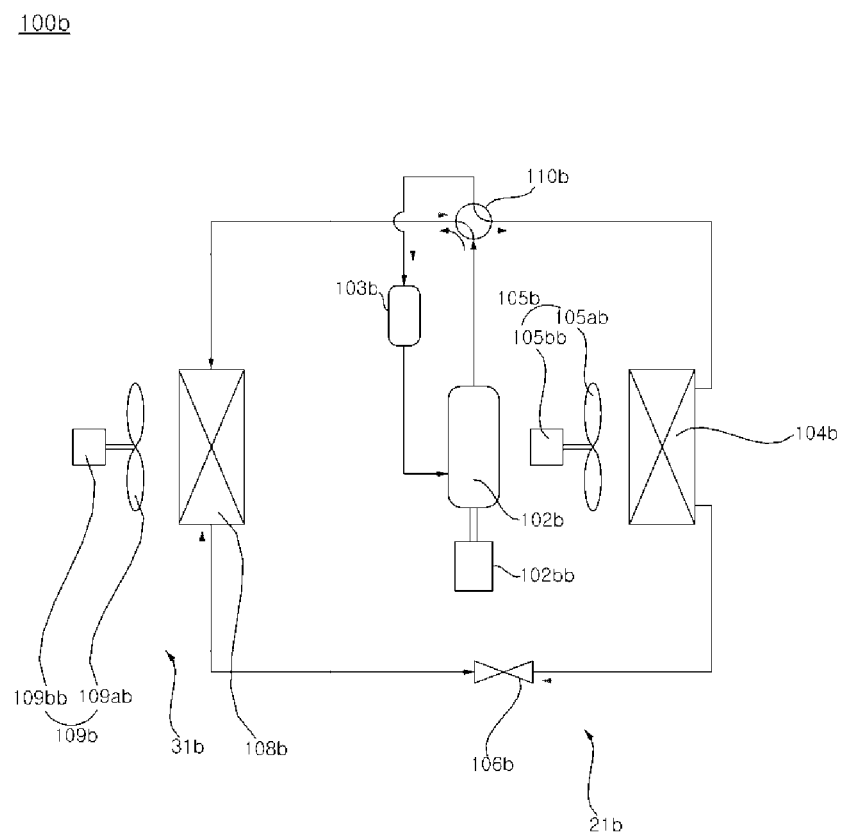
FIG. 12 is a schematic diagram illustrating the outdoor unit and the indoor unit of FIG. 11.

FIG. 12 is a schematic diagram illustrating the outdoor unit and the indoor unit of FIG. 11. Referring to FIG. 12, the air conditioner 100*b* is broadly divided into the indoor unit 31*b* and the outdoor unit 21*b*.

The outdoor unit 21*b* includes a compressor 102*b* serving to compress the refrigerant, a compressor motor 102*bb* for driving the compressor, an outdoor heat exchanger 104*b* serving to dissipate heat from the compressed refrigerant, an outdoor air blower 105*b* including an outdoor fan 105*ab* disposed on one side of the outdoor heat exchanger 104*b* to support heat dissipation from the refrigerant and a motor 105*bb* for rotating the outdoor fan 105*ab*, an expansion mechanism 106*b* for expanding the condensed refrigerant, a cooling/heating switching valve 110*b* for switching between flow paths of the compressed refrigerant, and an accumulator 103*b* for temporarily storing the evaporated refrigerant, removing moisture and foreign substances from the stored refrigerant, and then supplying the refrigerant of a constant pressure to the accumulator 103*b*.

The indoor unit 31*b* includes an indoor heat exchanger 108*b* disposed in the indoor space to perform the cooling/heating functions and an indoor air blower 109*b* including an indoor fan 109*ab* disposed on one side of the indoor heat exchanger 108*b* to support heat dissipation from the refrigerant and a motor 109*bb* for rotating the indoor fan 109*ab*. At least one indoor heat exchanger 108*b* may be installed. As the compressor 102*b*, at least one of an inverter compressor and a constant speed compressor may be employed. The air conditioner 100*b* may be configured as an air cooler for cooling the indoor space or as a heat pump for cooling or heating the indoor space.

The compressor 102*b* in the outdoor unit 21*b* of FIG. 11 may be driven by a motor driving apparatus for driving a compressor motor 250*b* such as the motor driving apparatus of FIG. 1. Alternatively, the indoor fan 109*ab* or the outdoor fan 105*ab* may be driven by a motor driving apparatus for driving an indoor fan motor 109*bb* or an outdoor fan motor 150*bb*, such as the motor driving apparatus of FIG. 1.

Figure 13:
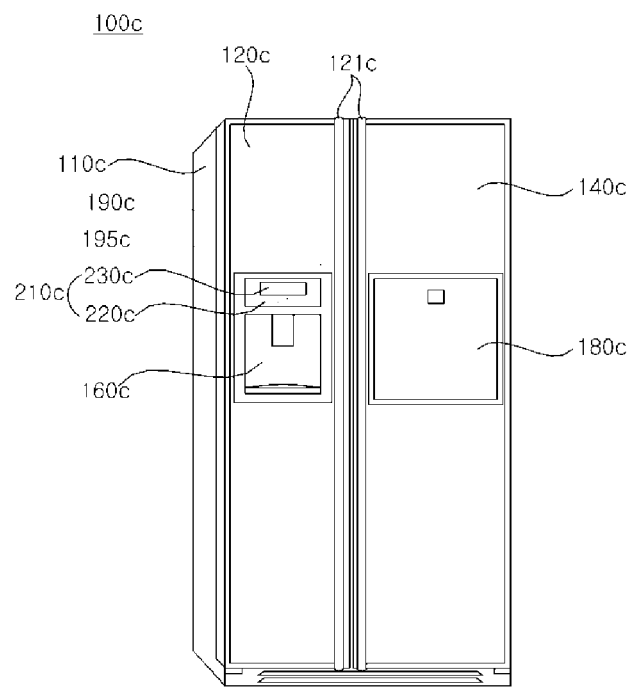
FIG. 13 is a perspective view illustrating a refrigerator which is another exemplary home appliance according to an embodiment of the present disclosure.

FIG. 13 is a perspective view illustrating a refrigerator which is another exemplary home appliance according to an embodiment of the present disclosure.

Referring to FIG. 13, the overall exterior of a refrigerator 100*c* related to the present disclosure is defined by a case 110*c* having an inner space partitioned into a freezer compartment and a cooling compartment, which are not shown, a freezer compartment door 120*c* for shielding the freezer compartment, and a cooling compartment door 140*c* for shielding the cooling compartment.

The front surfaces of the freezer compartment door 120*c* and the cooling compartment door 140*c* are provided with door handles 121*c* protruding forwards such that the user can easily grip the door handles 121*c* to rotate the freezer compartment door 120*c* and the cooling compartment door 140*c*. The front surface of the cooling compartment door 140*c* may be further provided with a home bar 180*c*, which is a convenience means allowing the user to take out a stored item such as a beverage without opening the cooling compartment door 140*c*.

The front surface of the freezer compartment door 120*c* may be further provided with a dispenser 160*c*, which is a convenience means allowing the user to take out ice or drink water without opening the freezer compartment door 120*c*. A control panel 210*c* for controlling operation of the refrigerator 100*c* and displaying the operation status of the refrigerator 100*c* may be provided on the upper side of the dispenser 160*c*.

While the dispenser 160*c* is illustrated as being disposed on the front surface of the freezer compartment door 120*c*, embodiments of the present disclosure are not limited thereto. The dispenser 160*c* may be disposed on the front surface of the cooling compartment door 140*c*.

Meanwhile, the inner upper portion of the freezer compartment (not shown) may be provided with an icemaker 190*c* for making ice out of the supplied water using cold air in the freezer compartment and an ice bank 195*c* installed inside the freezer compartment (not shown) to contain separated ice pieces made by the icemaker. Although not shown in the figure, an ice chute (not shown) for guiding fall of ice from the ice bank 195*c* into the dispenser 160*c* may be further provided.

The control panel 210*c* may include an input unit 220*c* comprising multiple buttons and a display unit 230*c* for displaying a control window and an operation status.

The display unit 230*c* displays a control window, an operation status and information such as a temperature in the refrigerator. For example, the display unit 230*c* may display a service mode (ice cubes, water, chipped ice) of the dispenser, a set temperature of the freezer compartment, and a set temperature of the cooling compartment.

The display unit 230c may be implemented by employing, for example, a liquid crystal display (LCD), light emitting diodes (LEDs), and organic light emitting diodes (OLEDs). The display unit 230c may also be implemented by employing a touchscreen capable of performing the function of the input unit 220c.

The input unit 220c may be provided with multiple manipulation buttons. For example, the input unit 220c may include a dispenser setting button (not shown) for setting a service mode (ice cubes, water, chipped ice, etc.) of the dispenser, a freezer compartment temperature setting button (not shown) for setting the temperature of the freezer compartment, a cooling compartment temperature setting button (not shown) for setting the temperature of the cooling compartment. The input unit 220c may be implemented by a touchscreen capable of performing the function of the display unit 230c.

The refrigerator according to embodiments of the present disclosure is not limited to the illustrated double door type refrigerator. The refrigerator may be of any type of refrigerator including one door type, sliding door type, and curtain door type.

Figure 14:
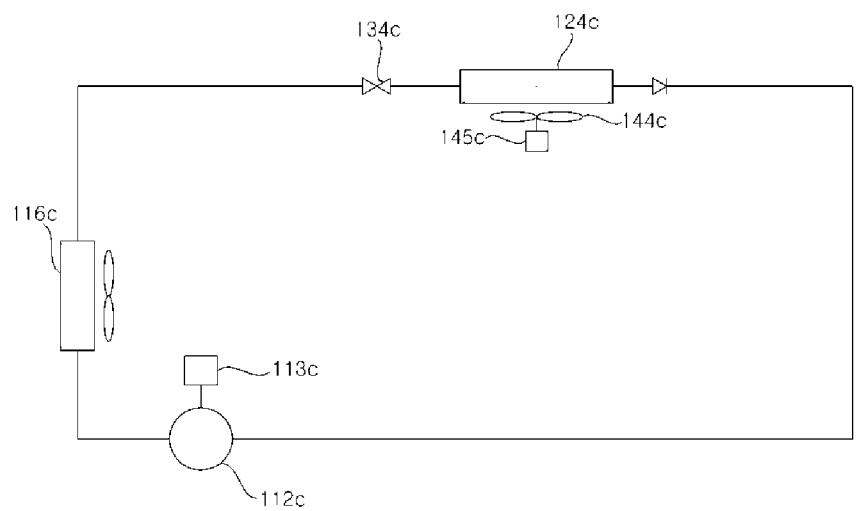
FIG. 14 is a diagram schematically illustrating configuration of the refrigerator of FIG. 13.

FIG. 14 is a diagram schematically illustrating configuration of the refrigerator of FIG. 13. Referring to FIG. 14, the refrigerator 100c may include a compressor 112c, a condenser 116c for condensing a refrigerant compressed by the compressor 112c, a freezer compartment evaporator 124c disposed on the freezer compartment (not shown) to evaporate the condensed refrigerant supplied from the condenser 116c, and a freezer compartment expansion valve 134c for expanding the refrigerant supplied from the freezer compartment evaporator 124c.

While FIG. 14 illustrates that one evaporator is used, each of the cooling compartment and the freezer compartment may employ an evaporator. That is, the refrigerator 100c may further include a cooling compartment evaporator (not shown) disposed on the cooling compartment (not shown), a 3-way valve (not shown) for supplying the refrigerant condensed by the condenser 116c to the cooling compartment evaporator (not shown) or the freezer compartment evaporator 124c, and a cooling compartment expansion valve (not shown) for expanding the refrigerant supplied to the cooling compartment evaporator (not shown).

The refrigerator 100c may further include a liquid-gas separator (not shown) in which the refrigerant from the evaporator 124c is separated into liquid and gas. The refrigerator 100c may further include a cooling compartment fan (not shown) and a freezer compartment fan 144c, which suction cold air arriving via the freezer compartment evaporator 124c and supply the same to the cooling compartment (not shown) and the freezer compartment (not shown). The refrigerator 100c may further include a compressor drive unit 113c for driving the compressor 112c, a cooling compartment drive unit (not shown) for driving the cooling compartment fan (not shown), and a freezer compartment fan drive unit 145c for driving the freezer compartment fan 144c.

Referring to FIG. 14, the evaporator 124c is used for both the cooling compartment and the freezer compartment. In this case, a damper (not shown) may be installed between the cooling compartment and the freezer compartment, and the fan (not shown) may forcibly blow the air cooled by the evaporator to the freezer compartment and the cooling compartment.

The compressor 112c of FIG. 14 may be driven by a motor driving apparatus for driving the compressor motor, such as the motor driving apparatus of FIG. 1. Alternatively, the cooling compartment fan (not shown) or the freezer compartment fan 144c may be driven by a motor driving apparatus for driving the cooling compartment fan motor (not shown) or the freezer compartment fan motor (not shown), such as the motor driving apparatus of FIG. 1.

The motor driving apparatus and the home appliance having the same according to embodiments of the present disclosure are not limited to configurations and methods of the embodiments described above. Variations may be made to the embodiments described above by selectively combining all or some of the embodiments.

A motor driving method or a method for operating the home appliance according to the present disclosure is implementable by code which can be read, on a recording medium which can be read by a processor provided to the motor driving apparatus or home appliance, by the processor. The recording medium readable by the processor includes all kinds of recording devices for storing data which can be read by the processor.

As is apparent from the above description, the present disclosure has the following effects. According to an embodiment of the present disclosure, a motor driving apparatus and a home appliance including the same include include an inverter to convert a direct current (DC) power into an alternating current (AC) power through a switching operation and to output the converted AC power to a motor, an output current detector to detect an output current flowing through the motor, a controller to control the inverter, wherein, during a first interval after the motor stops, the controller controls a phase current of a predetermined frequency to flow through the motor to estimate a position of a rotor of the motor, and estimates the position of the rotor of the motor based on the detected output current while the phase current of the predetermined frequency flows through the motor. Thereby, the sensorless motor driving apparatus can easily estimate the position of the motor rotor.

According to another embodiment of the present disclosure, a motor driving apparatus includes an inverter to convert a direct current (DC) power into an alternating current (AC) power through a switching operation and to output the converted AC power to a motor, an output current detector to detect an output current flowing through the motor, a controller to control the inverter, wherein, during a first interval after the motor stops, the controller controls a d-axis current command value of a first level with respect to a synchronization reference frame to be applied, extracts a d-axis current with respect to the synchronization reference frame from the detected output current, and estimates a position of a rotor of the motor based on the extracted d-axis current with respect to the synchronization reference frame.

Particularly, as the position of the rotor of the motor is estimated by applying the d-axis current command value of the first level with respect to the synchronization reference frame, noise may not be produced in the motor, the estimation may be performed in a short time. Thereafter, in aligning the motor, the rotor of the motor is aligned at the estimated position of the rotor of the motor. Thereby, the rotor may be quickly aligned at the estimated position with the motor remaining in a stationary state.

In addition, as the d-axis current command value of the first level with respect to the synchronization reference frame is applied, an error with respect to the real position of the rotor may be reduced. Therefore, the present disclosure has been made in view of the above problems, and it is an object of the present disclosure to provide a sensorless motor driving apparatus capable of easily estimating the position of a motor rotor and a home appliance including the same.

In accordance with an aspect of the present disclosure, the above and other objects can be accomplished by the provision of a motor driving apparatus including an inverter to convert a direct current (DC) power into an alternating current (AC) power through a switching operation and to output the converted AC power to a motor, an output current detector to detect an output current flowing through the motor, a controller to control the inverter, wherein, during a first interval after the motor stop, the controller controls a phase current of a predetermined frequency to flow through the motor to estimate a position of a rotor of the motor, and estimates the position of the rotor of the motor based on the detected output current while the phase current of the predetermined frequency flows through the motor.

In accordance with another aspect of the present disclosure, the above and other objects can be accomplished by the provision of a motor driving apparatus including an inverter to convert a direct current (DC) power into an alternating current (AC) power through a switching operation and to output the converted AC power to a motor, an output current detector to detect an output current flowing through the motor, a controller to control the inverter, wherein, during a first interval after the motor stop, the controller controls a d-axis current command value of a first level with respect to a synchronization reference frame to be applied, extracts a d-axis current with respect to the synchronization reference frame from the detected output current, and estimates a position of a rotor of the motor based on the extracted d-axis current with respect to the synchronization reference frame.

In accordance with another aspect of the present disclosure, the above and other objects can be accomplished by the provision of a home appliance including a motor, an inverter to convert a direct current (DC) power into an alternating current (AC) power through a switching operation and to output the converted AC power to the motor, an output current detector to detect an output current flowing through the motor, a controller to control the inverter, wherein, during a first interval after the motor stop, the controller controls a phase current of a predetermined frequency to flow through the motor to estimate a position of a rotor of the motor, and estimates the position of the rotor of the motor based on the detected output current while the phase current of the predetermined frequency flows through the motor. Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving apparatus comprising:
    an inverter to convert direct current (DC) power into alternating current (AC) power and to output the AC power to a motor;
    an output current detector to detect an output current flowing to the motor; and
    a controller to control the inverter, wherein, during a first interval after the motor stops, the controller controls the inverter to provide a first phase current of a predetermined frequency to the motor, and estimates a position of a rotor of the motor based on the output current detected by the output current detector while the inverter is providing the first phase current of the predetermined frequency to the motor,
    wherein, during the first time interval, the controller controls a d-axis current command value of a first level with respect to a synchronization reference frame to be applied, extracts a d-axis current value with respect to the synchronization reference frame from the detected phase current, and extracts a maximum d-axis current value among the d-axis current value, assumes that the rotor located at a first position corresponding to the maximum d-axis current value, and estimates the first position of the rotor of the motor based on the maximum d-axis current value of the d-axis current extracted during the first interval, and
    wherein, during a second interval after the first interval, the controller controls the inverter to provide a second phase current of a predetermined level to flow through the motor to align the rotor of the motor at the estimated first position of the rotor.

2. The motor driving apparatus according to claim 1, wherein the second phase current causes the rotor of the motor to move to the estimated position.

3. The motor driving apparatus according to claim 1, wherein the controller controls the inverter to increase a frequency of the other phase current after the second interval.

4. The motor driving apparatus according to claim 1, wherein, during the second interval after the first interval, the controller controls the inverter to provide the second phase current to have a d-axis current command value of a second level with respect to the synchronization reference frame,
    wherein the second phase current aligns the rotor of the motor at the estimated position of the rotor, and
    wherein the second level is lower than the first level.

5. The motor driving apparatus according to claim 1, wherein the controller further controls the inverter to provide the second phase current having a d-axis current command value of a second level during a first portion of the second interval after the first interval and to have a d-axis current command value of a third level with respect to the synchronization reference frame during a second portion of the second interval, wherein the second phase current causes the rotor to align at the estimated position, and wherein the second level and the third level are lower than the first level.

6. The motor driving apparatus according to claim 5, wherein the controller further controls the inverter to provide a third phase current having a d-axis current command value of a fourth level with respect to the synchronization reference frame after the second interval, wherein the fourth level is lower than the first, the second, and the third levels.

7. The motor driving apparatus according to claim 1, wherein, during the first interval after the motor stops, the controller further controls the inverter such that the first phase current also has a predetermined magnitude.

8. The motor driving apparatus according to claim 1, wherein the controller comprises:
a speed calculator to calculate a speed of the rotor based on the detected output current;
a current command generator to generate a current command value based on the calculated speed and a speed command value;
a voltage command generator to generate a voltage command value based on the current command value and the detected output current; and
a switching control signal output module to generate a switching control signal for controlling the inverter based on the voltage command value.

9. The motor driving apparatus according to claim 8, wherein the controller further comprises:
a reference frame transformation module to transform the reference frame based on the detected output current, wherein the reference frame transformation module transforms the detected output current into a d-axis current and a q-axis current with respect to the synchronization reference frame,
wherein the speed calculator calculates the speed of the rotor based on the d-axis current with respect to the synchronization reference frame.

10. A home appliance comprising:
a cabinet;
a motor positioned in the cabinet;
an inverter to convert a direct current (DC) power into an alternating current (AC) power through a switching operation and to output the AC power to the motor;
an output current detector to detect an output current flowing to the motor; and
a controller to control the inverter, wherein, during a first interval after the motor stops, the controller controls the inverter to provide a first phase current of a predetermined frequency to the motor, and estimates the position of the rotor of the motor based on the output current detected by the output current detector while the inverter is providing the first phase current of the predetermined frequency to the motor,
wherein, during the first interval, the controller controls a d-axis current command value of a first level with respect to a synchronization reference frame to be applied, extracts a d-axis current value with respect to the synchronization reference frame from the detected phase current, and extracts a maximum d-axis current value among the d-axis current value, assumes that the rotor located at a first position corresponding to the maximum d-axis current value, and estimates the first position of the rotor of the motor based on the maximum d-axis current value of the d-axis current extracted during the first interval, and
wherein, during a second interval after the first interval, the controller controls the inverter to provide a second phase current of a predetermined level to flow through the motor to align the rotor of the motor at the estimated first position of the rotor.

11. The home appliance according to claim 10, wherein the second phase current causes the rotor of the motor to move to the estimated position.

12. The home appliance according to claim 10, wherein, during the second interval after the first interval, the controller controls the inverter to provide the second phase current having a d-axis current command value of a second level with respect to the synchronization reference frame, wherein the second phase current causes the rotor to be aligned at the estimated position, wherein the second level is lower than the first level.

* * * * *